United States Patent
Arimilli et al.

(12) 
(10) Patent No.: US 6,345,339 B1
(45) Date of Patent: *Feb. 5, 2002

(54) PSEUDO PRECISE I-CACHE INCLUSIVITY FOR VERTICAL CACHES

(75) Inventors: Ravi Kumar Arimilli, Austin; John Steven Dodson, Pflugerville, both of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,321

(22) Filed: Feb. 17, 1998

(51) Int. Cl.$^7$ .......................... G06F 12/14; G06F 12/12
(52) U.S. Cl. ...................... 711/141; 711/143; 711/144; 711/146; 711/122
(58) Field of Search ................................ 711/141, 144, 711/146, 122, 123, 130, 133, 142, 143, 145, 119

(56) References Cited

U.S. PATENT DOCUMENTS

| | | | | |
|---|---|---|---|---|
| 5,023,776 A | * | 6/1991 | Gregor | 711/122 |
| 5,317,716 A | * | 5/1994 | Liu | 711/144 |
| 5,319,766 A | * | 6/1994 | Thaller et al. | 395/425 |
| 5,551,001 A | * | 8/1996 | Cohen et al. | 395/449 |
| 5,553,262 A | * | 9/1996 | Ishida et al. | 711/123 |
| 5,694,573 A | * | 12/1997 | Cheong et al. | 711/122 |
| 5,809,529 A | * | 9/1998 | Mayfield | 711/137 |
| 5,996,048 A | * | 11/1999 | Cherabuddi et al. | 711/122 |
| 6,021,468 A | * | 2/2000 | Arimilli et al. | 711/122 |
| 6,199,144 B1 | * | 3/2001 | Arora et al. | 711/145 |

FOREIGN PATENT DOCUMENTS

EP  0 681 241 A1  11/1995 ........... G06F/12/08

OTHER PUBLICATIONS

Jim Handy, The Cache Memory Book, (c) 1998, 1993, p. 126.*

Yannick Deville, A Process–Dependent Partitioning Strategy for Cache Memories, 8345 Computer Architecture News 21 (1993) Mar., No. 1, pp. 26–33.

* cited by examiner

*Primary Examiner*—Matthew Kim
*Assistant Examiner*—B. Peugh
(74) *Attorney, Agent, or Firm*—Volel Emile; Bracewell & Patterson, L.L.P.

(57) ABSTRACT

A modified MESI cache coherency protocol is implemented within a level two (L2) cache accessible to a processor having bifurcated level one (L1) data and instruction caches. The modified MESI protocol includes two substates of the shared state, which denote the same coherency information as the shared state plus additional information regarding the contents/coherency of the subject cache entry. One substate, $S_{IC0}$, indicates that the cache entry is assumed to contain instructions since the contents were retrieved from system memory as a result of an instruction fetch operation. The second substate, $S_{IC1}$, indicates the same information plus that a snooped flush operation hit the subject cache entry while it's coherency was in the first shared substate. Once the first substate is entered, the coherency state does not transition to the invalid state unless an operation designed to invalidate instructions is received. Since the contents of a cache entry in the two coherency substates are presumed to be instructions, not data, instructions within an L2 cache are not discarded as a result of snooped flushes, but are retained for possible reloads by a local processor.

19 Claims, 3 Drawing Sheets

PSEUDO PRECISE I-CACHE INCLUSIVITY FOR VERTICAL CACHES

BACKGROUND OF THE INVENTION

1. Technical Field

The present invention relates in general to inclusivity in vertical cache hierarchies and in particular to selective inclusivity with respect to cached instructions. Still more particularly, the present invention relates to selective inclusivity to prevent cached instructions from being discarded due to deallocations in lower cache levels.

2. Description of the Related Art

Superscalar reduced instruction set (RISC) processors typically include bifurcated data and instruction caches in at least the level one (L1) layer of the storage hierarchy. Separate data and instructions caches are necessary due to the bandwidth required in contemporary superscalar processors, where instruction fetches and data references may easily exceed more than one cache access per processor cycle. L1 caches, which are typically imbedded within the processor hardware and designed for latencies of one processor cycle or less, are therefore usually bifurcated so that instruction and data references may be issued to separate caches during the same processor cycle.

Many data processing systems may contain multilevel cache hierarchies which are logically in line—that is, caches in higher levels are checked first, with a miss at a higher level prompting access to caches on lower levels. Multilevel caches are typically utilized to stage data to the processor with reduced access latency. Smaller, faster caches are employed in upper levels of the cache hierarchy while larger, slower caches at found in lower levels. Generally, such vertical cache configurations are thought of as inclusive. That is, the contents of each cache includes the contents of the cache immediately above it in the cache hierarchy.

When space is required within a cache for new data or instructions read from system memory, the cache selects a victim according to the particular replacement policy implemented for the cache and deallocates the selected cache location. In cases where a cache location contained in multiple caches is deallocated in one cache, inclusivity of logically in line caches is maintained by deallocating the same location in other caches. There are circumstances, however, where this produces an undesirable result. For example, if a cache location containing instructions is deallocated within a level three (L3) cache, the same space will generally be deallocated in a level two (L2) cache. If the processor/L1 cache thereafter attempts to reload instructions from the L2 cache, it may miss at the L2 and the L3 caches and (assuming no more levels in the cache hierarchy) be required to access the desired instructions from system memory. Instruction reloads may be necessary, for example, when a mispredicted branch is executed. Since the latency associated with a read from system memory is generally much longer than the latencies associated with the L2 and L3 caches, a significant performance delay may be incurred.

One problem with preventing instructions from being discarded when cache locations are deallocated is that there exists no clear mechanism for distinguishing instructions from data within a cache. Program source code within system memory may comprise an indistinguishable mixture of instructions and data. This may occur, for example, where a loader program resolves code linkages after loading the code into system memory. Thus, there exists no means for positively identifying instructions when a victim is selected so that a replacement policy may be designed to select an alternative victim. Moreover, it is not necessary that all cache levels be inclusive of the L1 instruction cache. It is simply desirable for an L2 cache to be inclusive of the L1 instruction cache's present and recent contents in order to minimize latency of instruction reloads. Requiring similar inclusivity at all levels of the cache hierarchy detracts from overall cache efficiency.

It would be desirable, therefore, to provide a mechanism for maintaining selective inclusivity with regard to instructions in upper levels of the cache hierarchy. It would further be advantageous if the mechanism were not affected by deallocations in lower cache levels, such that instruction cache inclusivity is not required in all cache levels.

SUMMARY OF THE INVENTION

It is therefore one object of the present invention to provide an improved system of inclusivity in vertical cache hierarchies.

It is another object of the present invention to a method and apparatus of providing selective inclusivity with respect to instructions cachied in vertical cache hierarchies.

It is yet another object of the present invention to provide selective inclusivily to prevent cached instructions from being discarded due to deallocations in lower cache levels.

The foregoing objects are achieved as is now described. A modified MESI cache coherency protocol is implemented within a level two (L2) cache accessible to a processor having bifurcated level one (L1) data and instruction caches. The modified MESI protocol includes two substates of the shared state, which denote the same coherency information as the shared state plus additional information regarding the contents/coherency of the subject cache entry. One substate, $S_{IC0}$, indicates that the cache entry is assumed to contain instructions since the contents were retrieved from system memory as a result of an instruction fetch operation. The second substate, $S_{IC1}$, indicates the same information plus that a snooped flush operation hit the subject cache entry while its coherency was in the first shared substate. Deallocation of a cache entry in the first substate of the shared coherency state within lower level (e.g., L3) caches does not result in the contents of the same cache entry in an L2 cache being invalidated. Once the first substate is entered, the coherency state does not transition to the invalid state unless an operation designed to invalidate instructions is received. Operations from a local processor which contravene the presumption that the contents comprise instructions may cause the coherency state to transition to an ordinary shared state. Since the contents of a cache entry in the two coherency substates are presumed to be instructions, not data, instructions within an L2 cache are not discarded as a result of snooped flushes, but are retained for possible reloads by a local processor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
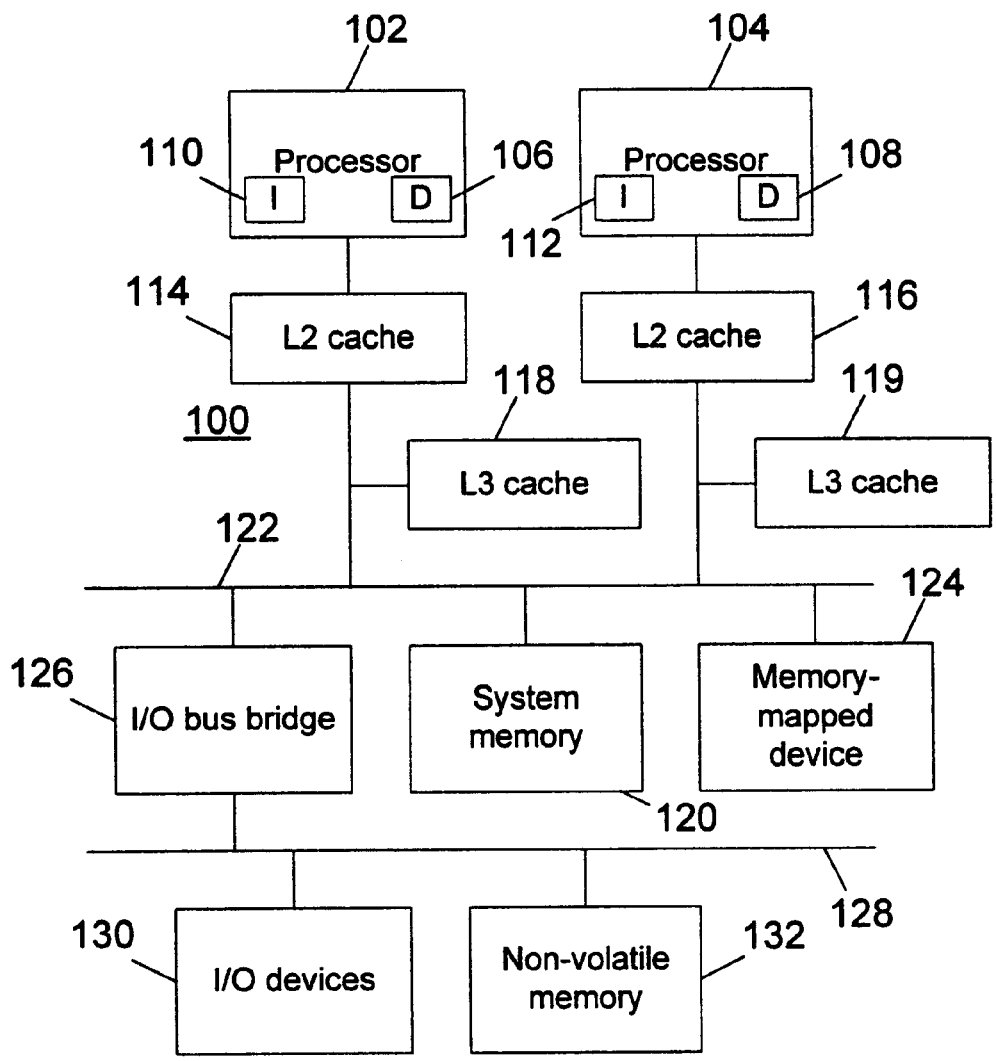
FIG. 1 depicts a multiprocessor data processing system in accordance with a preferred embodiment of the present invention.

With reference now to the figures, and in particular with reference to FIG. 1, a multiprocessor data processing system in accordance with a preferred embodiment of the present invention is depicted. Data processing system 100 is a symmetric multiprocessor (SMP) system including a plurality of processors 102 and 104, which preferably comprise one of the PowerPC™ family of processors available from International Business Machines of Armonk, N.Y. Although only two processors are depicted in the exemplary embodiment, those skilled in the art will appreciate that additional processors may be utilized in a multiprocessor data processing system in accordance with the present invention.

Each processor 102 and 104 includes a level one (L1) data cache 106 and 108, respectively, and an L1 instruction cache 110 and 112, respectively. Although illustrated as bifurcated instruction and data caches in the exemplary embodiment, those skilled in the art will recognize that a single, unified L1 cache may be implemented. In order to minimize data access latency, one or more additional levels of cache memory may be implemented within data processing system 100, such as level two (L2) caches 114 and 116 and level three (L3) caches 118 and 119. The lower cache levels—L2 and L3—are employed to stage data to the L1 caches and typically have progressively larger storage capacities but longer access latencies. For example, data caches 106 and 108 and instruction caches 110 and 112 may each have a storage capacity of 32 KB and an access latency of approximately 1–2 processor cycles. L2 caches 114 and 116 might have a storage capacity of 512 KB but an access latency of 5 processor cycles, while L3 caches 118 and 119 may have a storage capacity of 4 MB but an access latency of greater than 15 processor cycles. L2 caches 114 and 116 and L3 caches 118 and 119 thus serve as intermediate storage between processors 102 and 104 and system memory 120, which typically has a much larger storage capacity but may have an access latency of greater than 50 processor cycles.

Both the number of levels in the cache hierarchy and the cache hierarchy configuration employed in data processing system 100 may vary. L2 caches 114 and 116 in the example shown are dedicated caches connected between their respective processors 102 and 104 and system memory 120 (via system bus 122). L3 caches 118 and 119 are depicted as lookaside caches logically vertical with L2 caches 114 and 116. As a result, data or instructions may be looked up within one of L2 caches 114 or 116 and within one of L3 caches 118 and 119 simultaneously, although the data or instructions will only be retrieved from L3 cache 118 or 119 if the respective L2 cache 114 or 116 misses while L3 cache 118 or 119 hits. Those skilled in the art will recognize that various permutations of levels and configurations depicted may be implemented.

L2 caches 114 and 116 and L3 caches 118 and 119 are connected to system memory 120 via system bus 122. Also connected to system bus 122 may be a memory mapped device 124, such as a graphics adapter providing a connection for a display (not shown), and input/output (I/O) bus bridge 126. I/O bus bridge 126 couples system bus 122 to I/O bus 128, which may provide connections for I/O devices 130 and nonvolatile memory 132. System bus 122, I/O bus bridge 126, and I/O bus 128 thus form an interconnect coupling the attached devices, for which alternative implementations are known in the art. I/O devices 130 comprise conventional peripheral devices including a keyboard, a graphical pointing device such as a mouse or trackball, a display, and a printer, which are interfaced to I/O bus 128 via conventional adapters. Non-volatile memory 132 may comprise a hard disk drive and stores an operating system and other software controlling operation of system 100, which are loaded into volatile system memory 120 in response to system 100 being powered on. Those skilled in the art will recognize that data processing system 100 may include many additional components not shown in FIG. 1, such as serial and parallel ports, connections to networks or attached devices, a memory controller regulating access to system memory 120, etc. Such modifications and variations are within the spirit and scope of the present invention.

A typical communications transaction on system bus 122 includes a source tag indicating a source of the transaction, a destination tag specifying the intended recipient of the transaction, an address and/or data. Each device connected to system bus 122 preferably snoops all communication transactions on system bus 122, intervening in communications transactions intended for other recipients when necessary and reproducing changes to system memory data duplicated within the device when feasible and appropriate.

Figure 2:
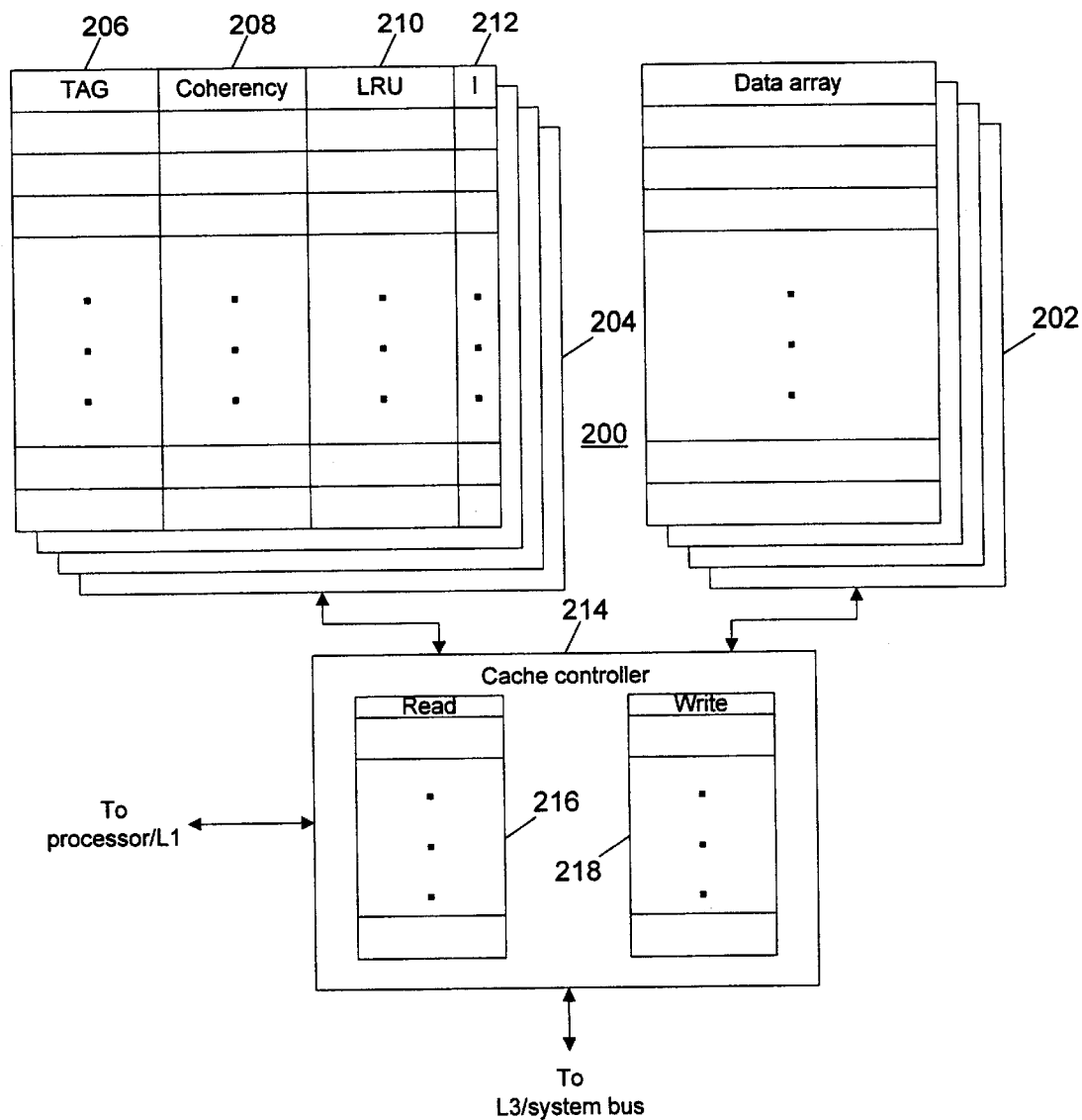
FIG. 2 is a block diagram of an L2 cache in accordance with a preferred embodiment of the present invention.

Referring to FIG. 2, a block diagram of an L2 cache in accordance with a preferred embodiment of the present invention is illustrated. The present invention supports pseudo-precise instruction cache inclusivity within L2 caches, such as L2 caches 114 and 116 depicted in FIG. 1, by implementing a modified version of the MESI cache coherency protocols as described in connection with the state diagram depicted in FIG. 3. L2 cache 200 may be an n way set associative cache utilizing 32 bit addresses. Accordingly, cache memory or data array 202 within L2 cache 200 comprises a number of congruence classes or rows each containing sufficient memory for storing n cache lines. A cache line, also referred to as a cache block, is the unit of cache memory which a coherency state describes. Generally a cache line is 32, 64 or 128 B long in contemporary data processing systems.

Cache directory 204 also contains a number of rows each containing n directory entries, each directory entry associated with a corresponding cache line in the equivalent row of cache memory 202. Each directory entry includes a tag field 206, a coherency state field 208, a least recently used (LRU) field 210, and an inclusion (I) field 212. Tag field 206 is utilized to store the tag field (e.g., bits [0–19]) of the system memory address of the data stored in an associated cache line. Coherency state field 208 defines, through a predefined bit combination, the coherency state of the data stored in the associated cache line. LRU field 210 indicates how recently the associated cache line has been accessed relative to other cache lines in the congruence class, and thus indicates which cache line should be cast out of the congruence class should the need for replacement of a cache line arise. Finally, inclusion field 212 indicates whether the associated cache line is also stored in the logically in line L1 cache, such as L1 data caches 106 and 108 and L1 instruction caches 110 and 112 depicted in FIG. 1.

Still referring to FIG. 2, L2 cache 200 also includes a cache controller 214 which manages storage and retrieval of cache lines from cache memory 202 and updates cache directory 204. Cache controller 214 acts in response to signals received from an associated processor, such as processor 102 or 104 depicted in FIG. 1, or to transactions snooped from the system bus. Cache controller 214 thus includes a number of queues, including read queue 216 and write queue 218 in which actions to be performed are placed until resources become available. For example, a local processor may issue a read request to L2 cache 200 as a result of executing a load instruction. Cache controller 214 places the read request in an entry within read queue 216, services the request by supplying the requested data to the local processor, and subsequently removes the read request from read queue 216. Cache controller 214 may also place a write request in write queue 218 to update LRU and inclusion fields 210 and 212, respectively, associated with the cache line containing the requested data. As an alternative example, a remote processor may initiate a system bus transaction indicating an intent to modify a specified cache line in its local cache. Cache controller 214, in response to snooping this transaction from the system bus, may place a request to read cache directory 204 in read queue 216 to determine if the specified cache line is resident within cache memory 204. If so, cache controller 214 initiates an appropriate response on the system bus and, if necessary, places a write request in write queue 218 which, when serviced, updates the coherency field 208 within cache directory 204 associated with the specified cache line. Although only one read queue 216 and one write queue 218 are depicted in the exemplary embodiment of FIG. 2, those skilled in the art will realize that the number of queues employed by cache controller 214 is a matter of design choice and that separate queues may be implemented either for cache directory accesses as opposed to cache memory accesses or for signals received from a local processor rather than transactions snooped from the system bus, or both.

In a preferred embodiment, coherency state field 208 of each entry in cache directory 204 is initialized to an invalid (I) state at system power-on to indicate that both the tag field 206 and the data stored in an associated cache line within cache memory 202 are invalid. Thereafter, coherency state field 208 may be updated to a coherency state within the modified MESI coherency protocols described in detail below. The state to which coherency state field 208 transitions depends on both the types of memory accesses made by processors in the system and the response of the storage hierarchy to those accesses, also described in greater detail below. Based on a coherency state indicated in coherency state field 208 of a requested cache line, cache controller 214 responds differently to snooped system bus operations indicating that an L3 cache, such as L3 cache 118 depicted in FIG. 1, is deallocating a specified cache line within its cache memory.

Figure 3:
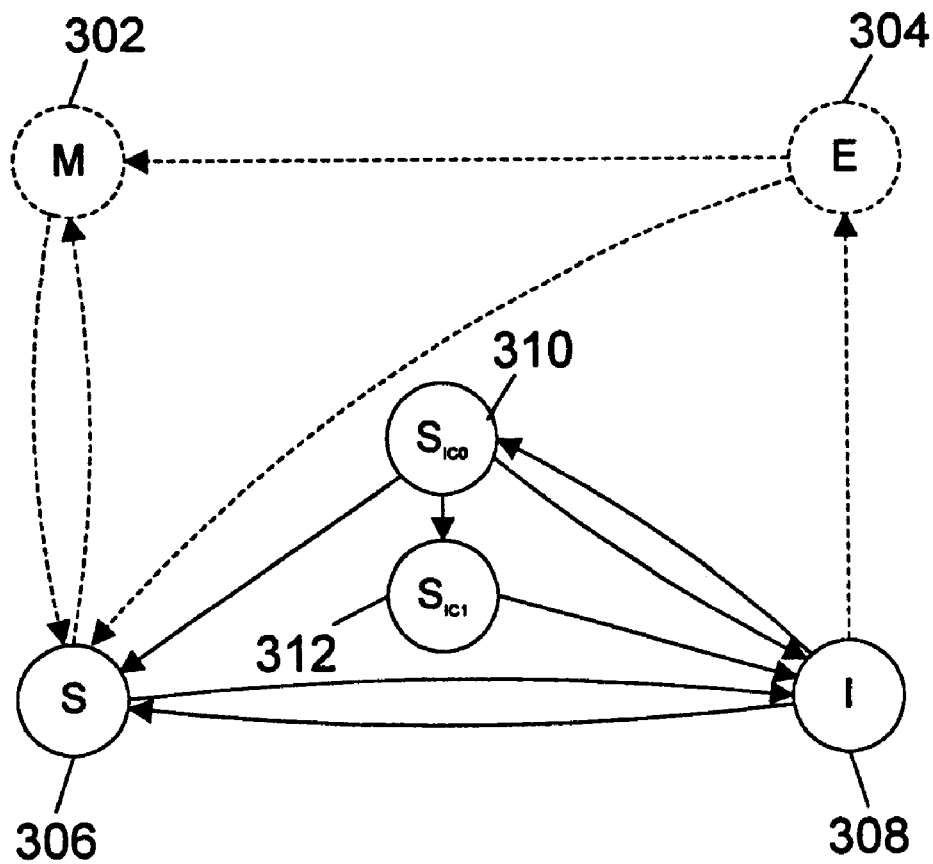
FIG. 3 depicts a state diagram of a modified MESI cache coherency protocol in accordance with a preferred embodiment of the present invention.

With reference now to FIG. 3, a state diagram of a modified MESI cache coherency protocol in accordance with a preferred embodiment of the present invention is depicted. The modified MESI protocol is implemented only within an L2 cache; a conventional MESI protocol is implemented in lower cache levels. The modified MESI protocol includes the same four basic states utilized in a conventional MESI protocol: modified (M) state 302, which indicates that the cache line has been modified with respect to corresponding data in system memory without also modifying the system memory data, such that the only valid copy of the data is within the cache entry storing the modified cache line or sector; exclusive (E) state 304, which indicates that the cache entry is consistent with system memory but is only found, within all caches at that level of the storage hierarchy, in the subject cache; shared (S) state 306, indicates that the cache entry may be found in the subject cache and at least one other cache at the same level in the storage hierarchy, with all copies of the data being consistent with the corresponding data in system memory; and invalid (I) state 308, which indicates that a cache entry—both the data and the address tag—within a given cache is no longer coherent with either system memory or other caches in the storage hierarchy. While modified state 302 and exclusive state 304 are supported, the invention relates to cache locations which are presumed to contain instructions rather than data. Therefore, these states should not be applicable to the cache locations of interest and will not be described fully herein.

The modified MESI protocol also includes two additional states, which are variants or sub-states of shared state 306. $S_{IC0}$ state 310 indicates that the cache entry may be found in the subject cache and at least one other cache at the same level in the storage hierarchy, with all copies of the cache entry being consistent with system memory, and also indicates that the subject cache entry was loaded as a result of an instruction fetch. $S_{IC1}$ state 312 indicates that the cache entry may be found in the subject cache and at least one other cache at the same level in the storage hierarchy, with all copies of the cache entry being consistent with system memory, and further indicates both that the subject cache entry was loaded as a result of an instruction fetch and that the same cache entry has been deallocated in lower levels of the storage hierarchy. Despite deallocation by a lower cache, the instructions within the L2 cache entry are maintained for possible access by an L1 cache.

State transitions within the modified MESI protocol are dependent on both the nature of memory access which prompted the cache entry to be loaded and the nature of the present memory access. If data is stored in a cache location as a result of a data read by a local processor (i.e. a data read operation prompted by a load instruction), then the contents of the cache line are assumed to comprise data and the coherency state transitions from invalid 308 to shared 306. On the other hand, if the contents of the cache block were retrieved as a result of an instruction fetch, it is assumed that the contents of that cache location comprise instructions and the coherency state transitions from invalid 308 to $S_{IC0}$ 310. If a cache location in $S_{IC0}$ state 310 is the subject of a subsequent data read operation initiated by a local processor, the original assumption regarding the cache contents comprising instructions is negated and the coherency state transitions from $S_{IC0}$ 310 to shared 306. Otherwise, however, if a cache entry in $S_{IC0}$ state 310 is hit by a snooped flush operation, such as may result from deallocation by a lower level cache, the coherency state transitions from $S_{IC0}$ 310 to $S_{IC1}$ 312. Once the coherency state transitions to $S_{IC1}$ 312, subsequent snooped flush hits to the same location are ignored and data read or read with intent to modify (rwitm) operations from a local processor are treated as missed. From either $S_{IC0}$ state 310 or $S_{IC1}$ state 312, the coherency state transitions to invalid state 308 only as a result of an instruction cache block invalidate (icbi) or equivalent operation. State transitions which may be made in the modified MESI protocol depicted in FIG. 3 are summarized below in Table I.

TABLE I

| State transition | Causes | Notes |
| --- | --- | --- |
| I → S | data read or rwitm | Cache entry not believed to contain instructions |
| I → $S_{IC0}$ | instruction fetch | Cache entry assumed to contain instructions |
| S → I | snooped flush | |
| $S_{IC0}$ → S | data read | Cache entry not believed to contain instructions |
| $S_{IC0}$ → I | instruction cache block invalidate | |
| $S_{IC0}$ → $S_{IC1}$ | snooped flush | Lower level cache deallocation |
| $S_{IC1}$ → I | instruction cache block invalidate | |

The coherency state transitions occur only within the L2 caches of a data processing system having additional, lower cache levels in the storage hierarchy. The same operations cause lower level caches, which follow the conventional MESI protocol, to undergo different coherency state transitions. The different coherency state transitions in the L2 and L3 caches which result from various common operations on a particular cache entry are compared below in Table II.

TABLE II

| Operation | L2 | L3 |
| --- | --- | --- |
| I-fetch | I → $S_{IC0}$ | I → S |
| data read | $S_{IC0}$ → S | S → S |
| snooped flush | $S_{IC0}$ → $S_{IC1}$ | S → I |

A significant distinction seen in Table II is the difference between coherency state transitions in the L2 and L3 caches as a result of a snooped flush. The L3 cache deallocates the cache entry as expected in the prior art. The L2 cache, however, retains the cache entry and transitions to a coherency state indicates both that the cache entry is assumed to contain instructions and that the same cache entry in lower level caches has been deallocated. Thus, the L2 cache retains the presumed instructions for subsequent possible reloads by a local processor. The L2 cache is inclusive of the present and recent contents of the L1 instruction cache of a local processor, but the L3 cache need not also be inclusive of the same contents. Selective inclusivity with regard to instructions is therefore maintained in upper levels of the cache hierarchy while overall cache efficiency is not degraded by requiring complete vertical inclusivity. The present invention thus prevents instructions in an L2 cache from being discarded by backward flushes resulting from deallocation in a lower level cache. The additional coherency states do not require a substantial increase in overhead, and the modifications need only be implemented within L2 caches in a multilevel cache hierarchy.

Although described above as a modification only of the conventional MESI protocol, the present invention may be implemented in conjunction with other modifications to the MESI protocol, including the R-MESI protocol in which the recent (R) state, essentially another variant of the shared state, indicates (1) that the cache entry may be found in both the subject cache and at least one other cache at the same level in the storage hierarchy and that all copies of the data in the subject cache and other caches are consistent with the corresponding data in system memory, and (2) that the subject cache, of all caches containing the shared data, most recently received the data in a system bus transaction such as a read from system memory. The R state is more fully described in U.S. patent application Ser. No. 08/839,557, which is incorporated in its entirety herein by reference. Substates of the recent state indicating that the cache entry is assumed to contain instructions rather than data and/or that the same cache entry has been deallocated in lower level caches may be implemented in a manner equivalent to the $S_{IC0}$ and $S_{IC1}$ states.

While the invention has been particularly shown and described with reference to a preferred embodiment, it will be understood by those skilled in the art that various changes in form and detail may be made therein without departing from the spirit and scope of the invention.

What is claimed is:

1. A method of maintaining cache coherency in a data processing system including a system memory and a plurality of caches, comprising:

performing an instruction fetch operation retrieving a storage item to a first cache containing both instructions and data and accessible to a processor having separate instruction and data caches; and setting a coherency indicator for the storage item to a first state indicating that the storage item may be found in the first cache and at least one other cache, that all caches containing the storage item are coherent with system memory, and that the storage item was retrieved by an instruction fetch operation, wherein said first state is a shared state variant resulting from an instruction fetch operation.

2. The method of claim 1, wherein the first state indicates that the storage item should be treated as comprising instructions.

3. The method of claim 2, further comprising:

responsive to detecting an operation invalidating an instruction cache location and including an address tag associated with the storage item while the coherency indicator is in the first state, updating the coherency indicator to a third state indicating that the storage item is invalid.

4. The method of claim 3, further comprising:

responsive to detecting a data read operation including an address tag associated with the storage item while the coherency indicator is in the first state, updating the coherency indicator to a second state indicating that the storage item may be found in the first cache and at least one other cache, that all caches containing the storage item are coherent with system memory, and that the storage item should be treated as not comprising instructions.

5. The method of claim 4, wherein the second state is a shared state.

6. A method of maintaining cache coherency in a data processing system including a system memory and a plurality of caches, comprising:

performing an instruction fetch operation retrieving a storage item to a first cache containing both instructions and data and accessible to a processor having separate instruction and data caches;

setting a coherency indicator for the storage item to a first state indicating that the storage item may be found in the first cache and at least one other cache, that all caches containing the storage item are coherent with system memory, and that the storage item was retrieved by an instruction fetch operation; and responsive to detecting a flush operation including an address tag associated with the storage item on a bus coupling the first cache to caches below the first cache while the coherency indicator is in the first state, updating the coherency indicator to a second state indicating that the storage item may be found in the first cache, that the first cache is coherent with system memory, and that other caches logically in line and below the first cache do not contain the storage item.

7. The method of claim 6, wherein the transition to the second state results from deallocation of a cache location containing the storage item within a second cache logically in line and below the first cache.

8. The method of claim 6, further comprising:

responsive to detecting an operation invalidating an instruction cache location and including an address tag associated with the storage item while the coherency indicator is in the second state, updating the coherency indicator to a third state indicating that the storage item is invalid.

9. A data processing system, comprising:

a processor having separate internal data and instruction caches;

a second cache containing both data and instructions connected to the processor;

a third cache containing both data and instructions connected to the second cache, the third cache logically below the second cache; and a coherency indicator associated with a storage item within the second cache, the coherency indicator having a first state indicating that the storage item may be found in the second cache and at least one other cache, that all caches containing the storage item are coherent with system memory, and that the storage item was retrieved by an instruction fetch, wherein said first state is a shared state variant resulting from the instruction fetch.

10. The data processing system of claim 9, wherein the coherency indicator has a second state indicating that the storage item may be found in the second cache but not in the third cache.

11. The data processing system of claim 10, wherein the coherency indicator has a third state indicating that the storage item is invalid, the coherency indicator transitioning from the second state to the third state in response to an operation invalidating a cache location corresponding to the storage item in the processor instruction cache.

12. The data processing system of claim 9, wherein the coherency indicator has a second state indicating that the storage item is invalid, the coherency indicator transitioning from the first state to the second state in response to an operation invalidating a cache location corresponding to the storage item in the processor instruction cache.

13. The data processing system of claim 9, wherein first state indicates that the storage item should be treated as comprising instructions.

14. The data processing system of claim 9, wherein the coherency indicator has a second state indicating that the storage item may be found in the second cache and at least one other cache, that all caches containing the storage item are coherent with system memory, and that the storage item should be treated as not comprising instructions.

15. A data processing system, comprising:

a processor having separate internal data and instruction caches;

a second cache containing both data and instructions connected to the processor;

a third cache containing both data and instructions connected to the second cache, the third cache logically below the second cache; and a coherency indicator associated with a storage item within the second cache, the coherency indicator having, a first state indicating that the storage item may be found in the second cache and at least one other cache, that all caches containing the storage item are coherent with system memory, and that the storage item was retrieved by an instruction fetch;

wherein the coherency indicator has a second state indicating that the storage item may be found in the second cache and at least one other cache, that all caches containing, the storage item are coherent with system memory, and that the storage item should be treated as not comprising instructions; and wherein the coherency indicator transitions from the first state to the second state in response to an operation retrieving the storage item to the processor data cache.

16. A cache supporting a cache coherency protocol in a data processing system, comprising:

data storage including a plurality of cache locations;

a cache directory including a plurality of entries, each directory entry uniquely associated with a cache location within the plurality of cache locations; and a coherency indicator within at least one directory entry, the coherency indicator having a first state indicating that content within the associated cache location is coherent with system memory, was retrieved by an instruction fetch operation, and is also held in another cache, wherein said first state is a shared state variant resulting from the instruction fetch.

17. The apparatus of claim 16, wherein the first state indicates that the cache location should be treated as containing instructions.

18. The apparatus of claim 16, wherein the coherency indicator has a second state indicating that the content within the associated cache location may not be found in other caches logically in line with and below the cache.

19. The apparatus of claim 16, wherein the coherency indicator has a second state indicating that the content should be treated as not containing instructions.

* * * * *